(12) United States Patent
Wong et al.

(10) Patent No.: US 7,035,470 B2
(45) Date of Patent: Apr. 25, 2006

(54) SYSTEM FOR HANDLING ERRORS RELATED TO IDCT DATA AND METHOD THEREOF

(75) Inventors: Daniel W. Wong, Cupertino (CA); Kenneth Man, North York (CA)

(73) Assignee: ATI Technologies, Inc., Thornhill (CA)

( * ) Notice: Subject to any disclaimer, the term of this patent is extended or adjusted under 35 U.S.C. 154(b) by 632 days.

(21) Appl. No.: 10/022,970

(22) Filed: Dec. 13, 2001

(65) Prior Publication Data

US 2002/0108078 A1    Aug. 8, 2002

Related U.S. Application Data

(63) Continuation-in-part of application No. 09/772,252, filed on Feb. 5, 2001, now Pat. No. 6,873,735.

(51) Int. Cl.
*G06K 9/36* (2006.01)
*G06K 9/46* (2006.01)

(52) U.S. Cl. ............ 382/233; 375/240.27; 380/217; 714/48; 714/723

(58) Field of Classification Search ............ 714/48–56, 714/723, 746, 747; 710/68; 382/166, 250, 382/233; 341/94; 348/425.2; 365/189.05; 375/240.27; 380/217, 269
See application file for complete search history.

(56) References Cited

U.S. PATENT DOCUMENTS 4,599,608 A * 7/1986 Matsuoka .................... 341/26
5,138,615 A * 8/1992 Lamport et al. ............ 370/400
5,216,503 A * 6/1993 Paik et al. ................ 348/390.1
5,657,277 A * 8/1997 Shirley .................. 365/189.07
5,832,003 A * 11/1998 Elkind ........................ 714/799
5,835,691 A * 11/1998 Matsunoshita ............. 358/1.17
6,141,420 A * 10/2000 Vanstone et al. ............. 380/30
6,310,888 B1 * 10/2001 Hamlin ....................... 370/466
6,404,817 B1 * 6/2002 Saha et al. ............. 375/240.27
6,490,624 B1 * 12/2002 Sampson et al. ........... 709/227
6,615,375 B1 * 9/2003 Mounes-Toussi et al. ..... 714/54
6,928,165 B1 * 8/2005 Takai ......................... 380/201

OTHER PUBLICATIONS

IBM Technical Disclosure Bulletin, No. NN9405527, May 1994, Title: "Method for Logging Concurrent Error Information".*

* cited by examiner

*Primary Examiner*—Bhavesh M. Mehta
*Assistant Examiner*—Yubin Hung

(57) ABSTRACT

A system and method for handling errors is provided. Errors related to the processing and storage of inverse discrete cosine transform (IDCT) image data cause hardware to become stalled. Stalled hardware may result in multiple image frames being dropped or lost during video playback. To avoid the stalling of hardware, the hardware is used to analyze the data being processed. Data being stored may be analyzed to determine if any error-characteristics, such as overflow or underflow, are present in the storing of the data. The data is manipulated to avoid stalling due to the error-characteristics.

19 Claims, 11 Drawing Sheets

SYSTEM FOR HANDLING ERRORS RELATED TO IDCT DATA AND METHOD THEREOF

CO-PENDING APPLICATIONS

This patent application is a C.I.P. of patent application Ser. No. 09/772,252, filed Feb. 5, 2001 now U.S. Pat. No. 6,873,735 entitled: SYSTEM FOR IMPROVED EFFICIENCY IN MOTION COMPENSATED VIDEO PROCESSING AND METHOD THEREOF.

FIELD OF THE DISCLOSURE

The present invention relates generally to processing video and more particularly to handling errors related to processing image error correction data.

BACKGROUND

Digital video is generally processed in sets of video frames. Each frame is a still image representing an instant in time of the video being processed. Each frame can further be broken down into blocks. The blocks are individually transmitted and then recombined to form a frame. The amount of data needed to represent the image blocks can become large. Motion compensation can be used to reduce the amount of data needed to represent the image blocks.

Using motion compensation, image blocks can be represented by motion compensation vectors and error correction data. Motion compensation vectors are used on prediction frames. An object in one frame may simply be displaced either partially or fully into in a new frame. Image blocks used to represent the object in the new frame may be processed with motion vectors, using the image blocks in the original frame as reference. The motion vectors provide the direction and distance in which the referenced image blocks have moved to in the new, or predicted, frame.

In some cases, motion compensation vectors are all that are needed to reproduce an image block. However, in many situations, some errors exist between the referenced image blocks and the blocks in the predicted frame. Error correction data can be sent to recover the differences and adequately generate the image block. The error correction data itself is basic image information, including the luminance of the pixels within the image block. A transform, such as a discrete cosine transform (DCT), can be used to reduce the size of the error correction data to a transformed data set. The transformed data set includes transform coefficients, which can then be inverse transformed to reproduce the error correction data. In some cases, no motion vectors can be generated for a given image block. For example, when a video switches to a new scene none of the objects in the new frame can be referenced to objects in the previous frame. In such a case, the image block is represented only with error correction data. Furthermore, some reference frames for motion compensation are made up of image blocks represented with only error correction data. They are referred to as intra-frames, or I-frames. Prediction frames, or P-frames, are motion compensated frames that use previous I- or P-frames for reference. Bi-directional frames can use previous or upcoming I- or P-frames for reference. It should be noted that B-frames are never used as reference themselves to avoid the accumulation of precision errors.

To process the frame data, conventional video processing hardware is used to capture the motion compensation vector data and the error correction data. The transformed data sets are inverse transformed, such as through an inverse discrete cosine transform (IDCT) component, to accurately reproduce the error correction data. Many times, errors are present in the transformed error correction data and motion compensation vector data received through the video processing hardware. While motion compensation vector data may continue to be processed despite errors present, conventional video processing hardware generally becomes stalled when trying to process erroneous transformed error correction data. Transformed error correction data is generally collected and processed in blocks of data by the IDCT component. Errors may cause an underflow or overflow of data into the block of data to be processed. For example, when an underflow occurs, some of the data related to a block of data is not received and the block of data is incomplete. When an overflow occurs, extraneous data is stored in relation to the same data block. An unexpected underflow may force the IDCT component to wait for more data to complete the data block. An overflow may force the IDCT component to attempt to process extraneous data, beyond the boundary of the block of data. Underflow and overflow errors can result in the loss of multiple frames of video data as conventional video processing hardware must wait for the IDCT component to resume normal operation. Therefore, a way to handle errors received by the IDCT component would be highly useful.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides a method for handling transformed error correction data. The method includes receiving transformed error correction data. In one embodiment, the transformed error correction data is inverse discrete cosine transform coefficients related to image data. The method includes determining if an error characteristic of the transformed error correction data has occurred. Errors in transmission may result in an overflow or underflow of the transmitted data in hardware. Such errors could cause the hardware to stall if the error is not dealt with. The method further includes providing an error indicator when it is determined an error characteristic, such as an overflow or underflow of data being stored, has occurred. In one embodiment, the error indicator allows a processing system to handle the data appropriately to avoid halting hardware. An advantage of at least one embodiment of the present invention is that erroneous data may be adjusted to avoid stalling of hardware.

Figure 1:
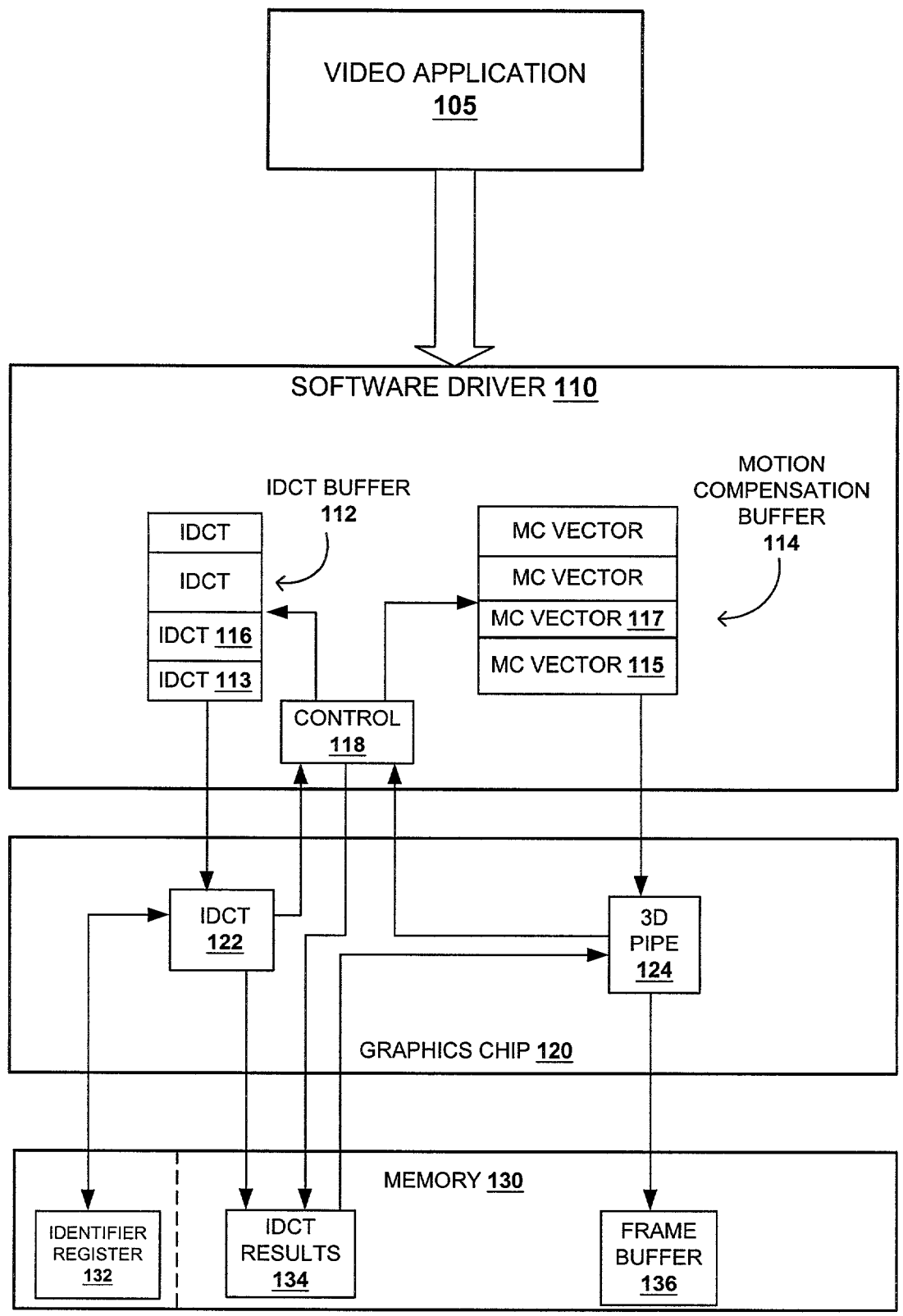
FIG. 1 is a block diagram illustrating a system for handling video data, according to one embodiment of the present invention.

Referring now to FIG. 1, a video processing system for collecting and processing motion compensation video data is shown, according to one embodiment of the present invention. In one embodiment, the video processing system is part of an information handling system. Software driver 110 is part of software located in memory within the information handling system, run with a central processing unit (CPU-not shown). Software driver 110 handles video requests generated by an application program, such as video application 105, and routes the video requests to graphics chip 120 where they can be processed. Video application 105 can include video applications such as digital video disk (DVD) player software, a digital television tuner, an application programming interface (API), video decoding software, or video gaming console.

In one embodiment, when using motion compensation techniques to display video images, video information related to a new block of image data within a frame of video is temporal-wise compressed using motion compensation (MC) vectors. Blocks in a new frame are compared to blocks in a reference frame. Objects in the reference frame may simply move or be displaced in the new frame. Therefore, a MC vector, indicating the direction and distance of the object in the reference frame has moved, can be used to describe where the blocks representing the object should be in the new frame. MC vectors may not always be enough to represent the block in the new, or predicted, frame. Differences between the block in the reference frame and the block in the new frame are transmitted as error correction data.

Error correction data is generally image data, including pixel information to reproduce any image information not covered using MC vectors. The error correction data can be compressed using a discrete cosine transform (DCT). The DCT is a discrete orthogonal transformation between a time and frequency domain. Generally a forward DCT (FDCT) is performed on the error correction data to generate transform coefficients, allowing an inverse DCT (IDCT) to later be used on the coefficients to restore the error correction data from the DCT results. The error correction data can correct for any image information left out using the MC vectors. Some blocks, even in predicted frames, may be sent using only transformed error correction data, without any corresponding MC vectors.

The DCT results and MC data can be received through video application 105. Video application 105 can be an application programming interface (API), or a device driver interface (DDI), such as a DirectX Video Acceleration API/DDI. The results of the DCT can be further compressed using run-length coding, wherein the number of zeros between values are delivered as discrete values between the coefficients. The video data, DCT results and MC vector data, are then sent by the API/DDI to a software driver, such as software driver 110.

Software driver 110 receives the video data from video application 105 and may decode the data if necessary, such as through a run-length decoder. In one embodiment, the DCT results are quantized when generated by the DCT. Accordingly, the values can be de-quantized to obtain a better representation of original video data. The DCT results can be used as IDCT coefficients by an inverse transform component, such as IDCT component 122, to reproduce the error correction data. Accordingly, the DCT results are stored in an IDCT buffer 112. The MC vector data is stored in a MC buffer 114. Error correction data resulting from the processing of the IDCT coefficients and the MC vector data are related to the same portions of an image. The IDCT coefficients and the MC vector data must be processed sequentially. For example, IDCT coefficients set 113 and MC vector set 115 relate to the same image portion. IDCT coefficients set 116 and MC vector set 117 relate to another image portion.

To track the relations between the IDCT coefficients and the MC data, a unique identifier is applied to each IDCT and MC vector set. In one embodiment, IDCT coefficients set 113 and MC vector set 115 are given one identifier; while, IDCT coefficients set 116 and MC vector set 117 are given another identifier. The identifier can be any unique value assigned to the data sets, such as a value which changes after each data set, such as from a counter, or a timestamp indicating when the data was received, such as from a clock. In one embodiment, the image portion represented by IDCT coefficients sets 113 and 116 and the MC data sets 115 and 117 include a block of image data, wherein a block can represent a portion of image data covering a space of eight by eight pixels. In another embodiment, the image portion includes a macroblock covering an image space of sixteen by sixteen pixels. It will be appreciated that other image portion sizes can be used and the size of the image portion represented can be altered without departing from the scope of the present invention.

The IDCT coefficients are then processed by an inverse transform, such as IDCT component 122, to generate the error correction data for the image block being represented. In at least one embodiment, when MC data from MC buffer 114 is to be processed by hardware, such as 3D pipe 124 on graphics chip 120, the corresponding error correction data must also be presented. Therefore, before the MC data related to an image portion is provided to 3D pipe 124, on graphics chip 120, the IDCT coefficient data related to the image portion is presented to IDCT component 122 on graphics chip 120. In one embodiment, graphics chip 120 represents a monolithic semiconductor device used for processing video data.

In one embodiment, IDCT coefficients set 113 is sent to IDCT component 122 of graphics chip 120. IDCT component 122 stores the unique identifier associated with IDCT coefficients set 113 in an identifier register 132. IDCT component 122 then performs an inverse transform to generate the error correction data represented by IDCT coefficients set 113. In one embodiment, the inverse transform includes an inverse discrete cosine transform. Identifier register 132 can be a hardware register in graphics chip 120. Alternatively, identifier register 132 may be a part of system memory in the information handling system, as illustrated in FIG. 1.

The results generated by IDCT component 122, are stored in IDCT results 134. IDCT results 134 represent a portion of external memory. As described herein, external memory is used to describe system or cache memory such as random access memory (RAM) or a first in first out (FIFO) memory array which is not a part of 3D pipe 124 or IDCT component 122. In comparison, a register is used herein to refer to internal hardware components used to store specific values within the hardware components, such as IDCT component 122 and 3d pipe 124. In one embodiment, IDCT results 134 represent a frame buffer used to store error correction data. In another embodiment, IDCT results 134 are stored in cache memory. IDCT component 122 sends an interrupt to control 118 of software driver 110. The interrupt indicates that IDCT component 122 has completed processing the IDCT coefficients, such as IDCT coefficients set 113. In one embodiment, the interrupt includes the unique identifier stored in identifier register 132. The unique identifier is used to indicate which IDCT coefficients were processed. Software driver 110 may use the unique identifier to determine the corresponding sets of MC vector data in MC buffer 114 to send.

MC vector data sets, such as MC vector set 115, corresponding to the processed IDCT coefficients blocks are sent by software driver 110 to a motion compensation processing component, such as 3D pipe 124. In one embodiment, 3D pipe 124 receives a memory address with the MC vector data sets to indicate where to read the error correction data, stored in IDCT results 134, related to the MC vector data sets. 3D pipe 124 processes the MC vector data along with the error correction data retrieved from memory to generate image data. The processed image data can be stored in frame buffer 136. Frame buffer 136 can be represented by a location in memory 130 or in hardware, such as in graphics chip 120. Alternatively, the processed image data can be delivered to a display device. In one embodiment, a prediction plane is obtained based on the motion compensation vector data and a reference frame. The prediction plane may combine with error correction data to produce the final image blocks.

It should be noted that 3D pipe 124 is capable of operating asynchronously to IDCT component 122. In one embodiment, the asynchronous nature is based on clocks used to run the components, wherein 3D pipe 124 and IDCT component 122 operate using separate clocks. In another embodiment, the asynchronous nature is based on the relationship between operations within the components, wherein there is no fixed time relationship between the completion of an operation on IDCT component 122 and the initiation of operations on 3D pipe 124. In one embodiment, while 3D pipe is processing the image data related to MC Vector set 115 and the processed error correction data from IDCT coefficients set 113, IDCT 122 can process a second set of IDCT coefficients, such as IDCT coefficients set 116, sent by software driver 110. However, if software driver 110 detects, such as through control 118, that the memory associated with IDCT results 134 is full of unread data, software driver 110 may restrict the transfer of IDCT coefficients sets until the memory can be cleared.

Once 3D pipe 124 has read the error correction data stored in IDCT results 134, 3D pipe 124 can send a second interrupt to control 1 18 in software driver 110. The second interrupt instructs software driver 110 that the data in IDCT results 134 has been read. Software driver 110 can then free the memory space associated with IDCT results 134. Software driver 110 can also send more IDCT coefficients from IDCT buffer 112 to IDCT component 122, allowing IDCT results 134 to be filled with new error correction data, while 3D pipe 124 is busy processing the received image data. Software driver 110 can also use the second interrupt to determine whether to display any completed image frames or portions of image frames.

In one embodiment, several sets of IDCT coefficients are sent to IDCT component 122 for processing. For example, IDCT coefficient sets 113 and 116 can be processed by IDCT component 122. The error correction data associated to the image portions represented by IDCT coefficient sets 113 and 116 can be saved as different portions of memory in IDCT results 134. If 3D pipe 124 is busy processing other image data, IDCT 122 can process both IDCT coefficient sets 113 and 116. Once software driver 110 received the unique identifier associated with IDCT coefficients set 116, through an interrupt on control 118, software driver 110 can send both MC data sets 115 and 117, recognizing that the respective IDCT coefficients sets 113 and 116 have already been processed. As discussed in FIGS. 4 and 5, several methods may be employed to optimize video processing for image portions associated mostly with error correction data or with motion compensation data.

In one embodiment, all data sent between software driver 110 and graphics chip 120 is encoded or scrambled to protect the video content represented. For example, the IDCT coefficients sent to IDCT component 122 and the motion compensation vector data sent to 3D pipe 124 is scrambled on software driver 110. Accordingly, graphics chip 120 would de-scramble the content, through a de-scrambling component (not shown), before it is processed by respective components. As previously discussed, the system described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices.

Figure 2:
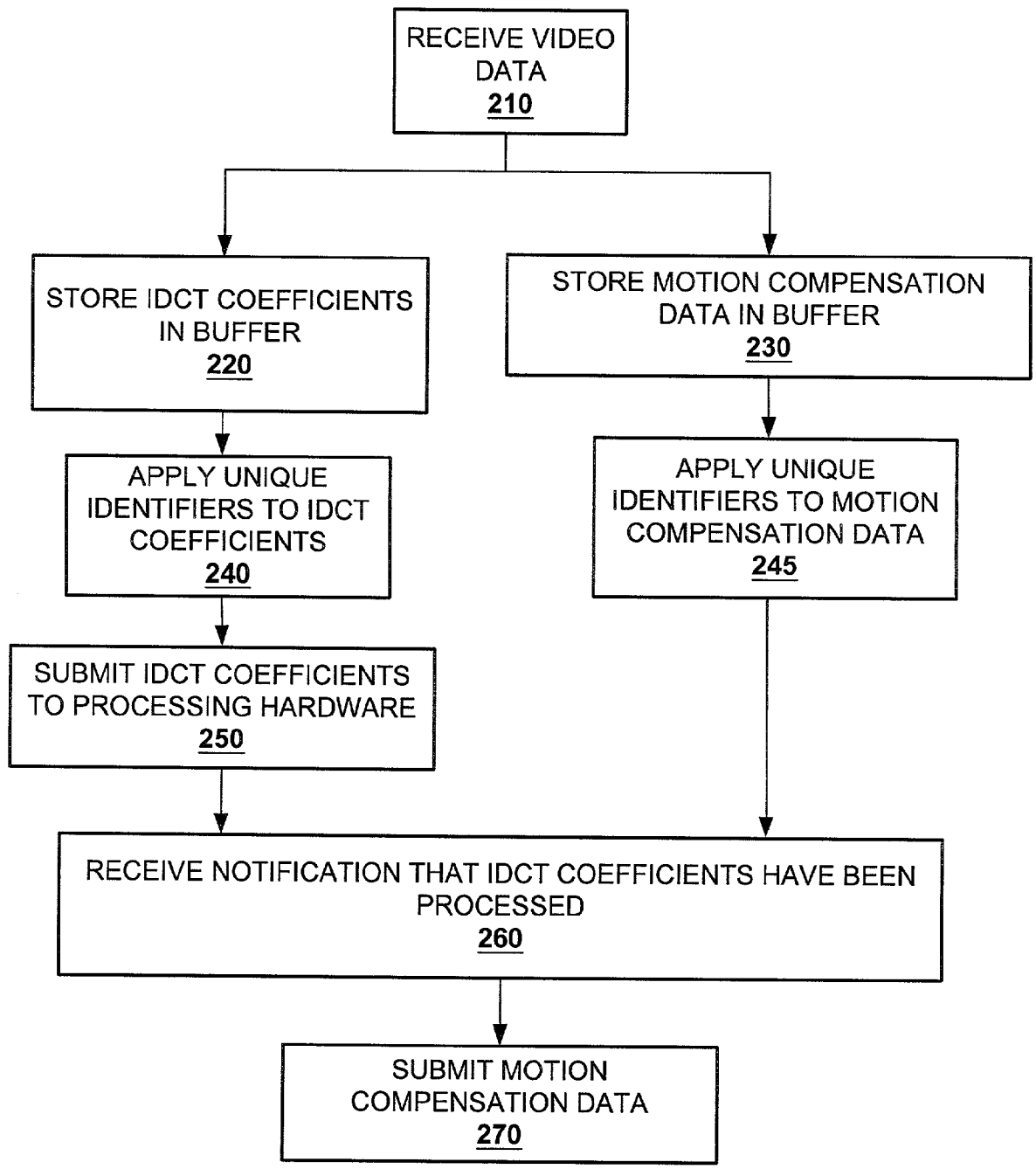
FIG. 2 is a flow diagram illustrating the steps for handling image data in a software driver, according to one embodiment of the present invention.

Referring now to FIG. 2, a flow chart of a method for a software driver to handle video data for delivery to a video processing hardware is shown, according to one embodiment of the present invention. As previously discussed, individual images of video are temporal-wise compressed using motion compensation. In one embodiment, the image is broken down into blocks of pixel elements. A target block in a target frame is compared to a reference frame and motion compensation vectors are generated indicating the displacement of a reference block in the reference frame that best describes the target block. Differences between the target block and the reference block are transformed using a discrete cosine transform (DCT). The transformed data are used as coefficients for an inverse DCT (IDCT). In one embodiment, a block refers to an eight by eight set of pixels. As previously discussed, the image can also be broken down into multiple sixteen by sixteen macroblocks of pixels. It will be appreciated that the image can be broken down into portions with sizes other than those discussed herein, without departing from the scope of the present invention.

In step 210, the software driver receives the video data, including motion compensation vectors and IDCT coefficients. Processing may be needed to handle the video data appropriately. For example, in one embodiment, the IDCT coefficients are compressed using run-length coding. Accordingly, a run-length decoding component of the software driver may be required to decode the IDCT coefficients. The video data may also be de-quantized, since many of the IDCT coefficients may be quantized to reduce bandwidth requirements. Quantization may cause unfavorable image artifacts when recreating the image. Therefore, further processing, such as image filtering, may be needed along with de-quantization to reduce the artifacts due to DCT quantization.

In step 220, the software driver stores the IDCT coefficients in a memory buffer. In step 230, the corresponding motion compensation vector data is also stored in a memory buffer. As previously discussed, the IDCT coefficients may relate to the same portion of an image as the motion compensation vector data. In one embodiment, the error correction data related to the IDCT coefficients must be processed with the motion compensation vector data. Accordingly, the software driver generates a unique identifier for tracking the IDCT coefficients and motion compensation vector data related to the same image portion. In step 240, the unique identifier is applied to the IDCT coefficients. In step 245, the unique identifier is applied to the motion compensation vector data related to the IDCT coefficients. The unique identifier may be used to identify and preserve the relationship between the motion compensation vector data and corresponding IDCT coefficients, representing the error correction data. In step 250, the software driver submits IDCT coefficients stored in the IDCT buffer to processing hardware. As previously discussed, the processing hardware performs an inverse transform on the IDCT coefficients to reproduce image error correction data.

In step 260, the software driver receives a notification from the processing hardware. The notification indicates that the processing hardware has completed processing at least some of the IDCT coefficients sent in step 240, and stored the processed error correction data in memory. The notification also indicates that the processing hardware is ready to receive motion compensation vector data to process the image block associated with the processed IDCT coefficients. In one embodiment, the notification sent is an interrupt generated by the processing hardware.

In step 270, the software driver submits motion compensation vector data stored in the motion compensation buffer to the processing hardware. The notification received in step 260 includes the unique identifier associated with the processed error correction data. By noting the unique identifier, the software driver identifies which of the stored motion compensation vector data to submit. The software driver may use the notification to locate the address of the processed error correction data stored in memory, related to the motion compensation vector data. In one embodiment, the software driver sends the memory address in which the processed error correction data can be accessed. The processing hardware can then read the memory address to access the error correction data for processing with the motion compensation vector data. The processing hardware processes the motion compensation vector data with the error correction data to generate the associated image block.

While the hardware is busy processing the motion compensation vector data and the error correction data, the software driver can continue to submit more IDCT coefficients to be processed, as in step 250. However, if the memory where the processed error correction data is stored is full, the software driver must wait until the hardware has read the processed error correction data. In one embodiment, the hardware sends a second notification to the software driver. Once the processing hardware has read the error correction data from memory, the processing hardware sends the second notification to the software driver. Once it receives the second notification, the software driver can free up the memory where the error correction data is being stored, allowing new error correction data to be stored. The notification indicates that additional IDCT coefficients can be sent to the processing hardware. In one embodiment, the second notification is an interrupt generated by the processing hardware.

Figure 3:
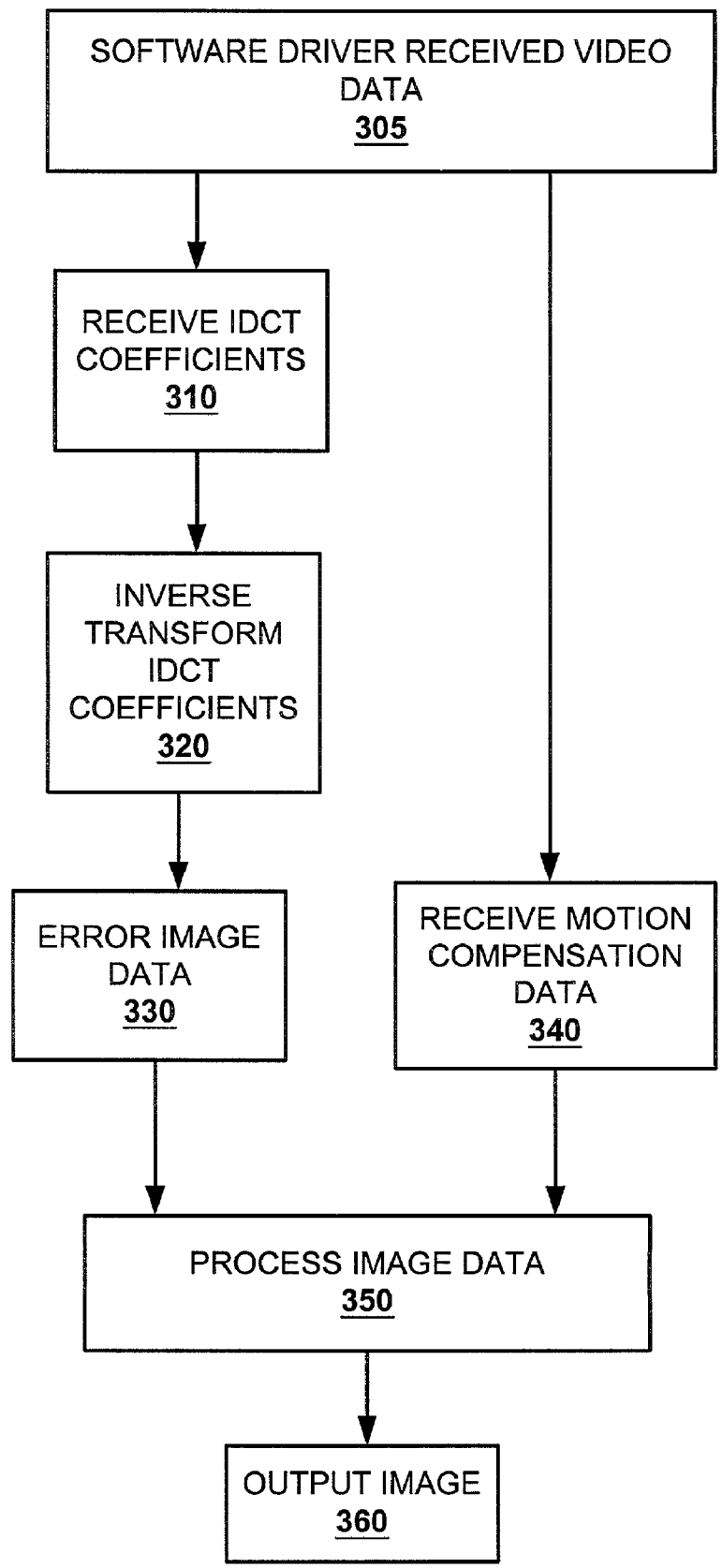
FIG. 3 is a flow diagram illustrating the steps for processing video data in hardware, according to one embodiment of the present invention.

Referring now to FIG. 3, a flow chart illustrating a method of processing data related to video in hardware is shown, according to at least one embodiment of the present invention. In step 305, a software driver receives the video data. The transformed results, IDCT coefficients, and the motion compensation vectors are stored in buffers by the software driver, storing motion compensation data for several image blocks. In one embodiment, the data is stored until the video processing hardware is ready to process more video data.

In step 310, the video processing hardware receives sets of IDCT coefficients from the software driver. The IDCT coefficients are passed along to an IDCT component, such as IDCT component 122 (FIG. 1). In step 320, the IDCT component begins to process the IDCT coefficients. The IDCT coefficients are used to reproduce the error image data represented by the IDCT coefficients. In one embodiment, the IDCT component stores a unique identifier associated with the IDCT coefficients. The unique identifier allows the processing hardware to notify the software driver from step 305 which of the IDCT results is ready to be processed, allowing the software driver to send corresponding motion compensation data. In one embodiment, the notification to the software driver is sent as an interrupt. In step 330, the processed IDCT data is stored as error correction data. As previously discussed, the error correction data may be stored in system memory or in a frame buffer.

In step 340, the processing hardware receives motion compensation vector data from the software driver. In at least one embodiment, the motion compensation vector data corresponds to the same image block as the processed error image data stored in step 330. In one embodiment, the processing hardware uses a unique identifier associated with the received motion compensation vector data to determine where the stored error correction data the motion compensation vector data is associated with is stored. For example, in one embodiment, the memory address in which the associated error correction data is stored is passed along with the motion compensation vector data. The processing hardware simply reads the address provided by the software driver.

It should be noted that the IDCT component used to process the IDCT coefficients and the processing hardware used to process the motion compensation vector data can operate asynchronously. The software driver is used to coordinate and synchronize the activities of the IDCT component and the processing hardware. For example, while the processing hardware is busy processing a set of motion compensation vector data, the software driver can send more IDCT coefficients to be processed by the IDCT component. However, the memory used to store the processed error correction data related to the IDCT coefficients may become full. In one embodiment, the processing hardware sends an interrupt to the software driver to indicate that the error correction data has been read, allowing the memory to be cleared and more IDCT coefficients to be sent and processed. In step 350, the motion compensation vector data and the error image data are processed together to generate at least a portion of an image. In step 360, the generated image portion is output. In one embodiment, the image portion is output to a frame buffer in memory. In another embodiment, the image portion is output to a display device where it is displayed as a portion of an image. It will be appreciated that enough data to process an entire image frame or sets of image frames may be processed and output. In one embodiment, all data submitted to hardware, steps 250 and 270 (FIG. 2), is scrambled to protect the content represented by the data.

Figure 4:
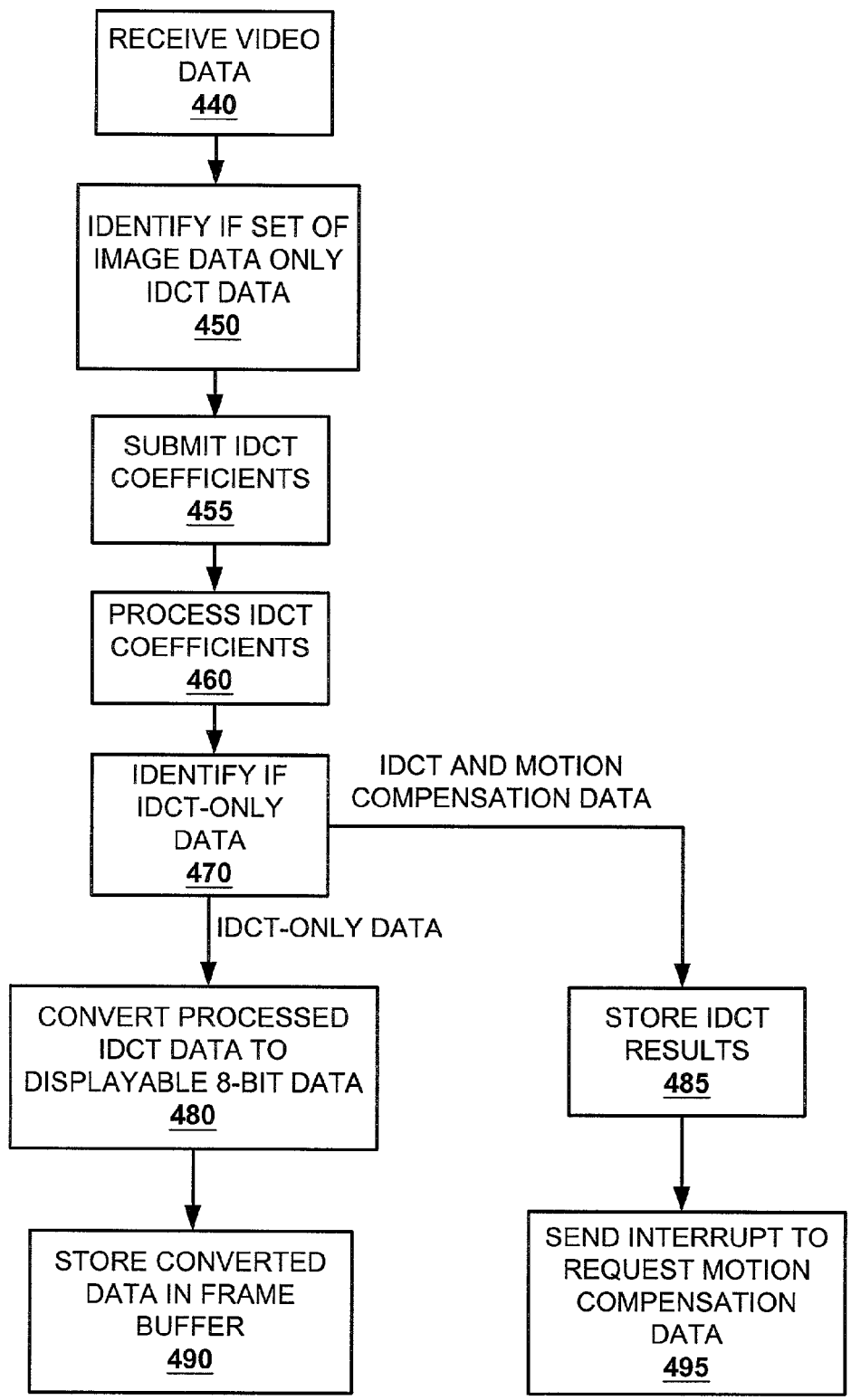
FIG. 4 is a flow diagram illustrating steps for optimizing image processing for image data associated with only IDCT data, according to one embodiment of the present invention.

Referring now to FIG. 4, a method of optimizing video processing for image data containing only IDCT data is shown, according to one embodiment of the present invention. As previously discussed, motion compensation video data generally consists of error correction data and motion compensation vector data. The error correction data is compressed into IDCT coefficients. Occasionally, video data will consist of only IDCT coefficients. Since no associated motion compensation vectors are provided, 3D pipe 124 (FIG. 1) is not needed for processing the image data. Since the processed IDCT data can be provided directly to frame buffer 136 (FIG. 1), the memory space for IDCT results 134 (FIG. 1) is also not needed.

In step 440, a software driver receives image data associated with a block of an image frame. As previously discussed, the software driver may perform processing on the received image data. For example, run-length decoding or de-quantization may be necessary for processing the image data. In step 450, the software driver identifies if the image data only has IDCT coefficient data associated with it. In one embodiment, the software driver identifies the IDCT-only image data when the image frame to be processed is an I-frame.

As previously discussed, portions of a single image frame may be stored as separate blocks of data, wherein the data includes Luma (Y) data and Chroma (UV) data. Compression of the data within a single block may be performed using data transformation, such as through the DCT, or by sub-sampling the Y and UV data. Accordingly, further compression may be performed among sets of consecutive frames, or video. A single frame may be compressed through inter-frame coding, wherein differences among blocks of sequential frames are used in data compression. A method of temporal prediction may be used for inter-frame coding of video data. Initially, a set of blocks corresponding to a first frame of data is transmitted. The data may include intra-frame coding among the blocks and the frame is generally referred to as an I-frame. Once the I-frame information has been sent, a frame with prediction data, referred to as a P-frame, may be transmitted. The P-frame data includes prediction vectors for the blocks in the preceding frame, such as motion vectors relating to blocks within a previously sent I-frame or P-frame.

In order to allow a decoder to appropriately decode a video from nearly any point in the video transmission, multiple I- or P-frames must be given to provide references. Additionally, bi-directional, or B-frames, may be transmitted to provide prediction information for previous and upcoming frames, allowing prediction information to be gathered when playing stored video data in reverse. B-frames may also be sent intra-coded, without any prediction information. It should be noted that B-frames are not used as references for other frames using temporal prediction.

By detecting when an I-frame is processed, the software driver can recognize that the image data is entirely made up of IDCT data. Alternatively, the software driver may determine the image data is entirely made up of IDCT data by analyzing the data packet regarding the image data it receives. In step 455, the IDCT-only data is submitted to an IDCT component, such as IDCT component 122 (FIG. 1), in processing hardware. When submitting the IDCT-only data, the software driver may attach an identifier to the submitted data to indicate that there is no associated motion compensation data, allowing the IDCT component to initiate the optimization techniques described herein.

In step 460, the IDCT component processes the received IDCT coefficients to generate image data from the IDCT coefficients. In step 470, the IDCT component identifies if the IDCT data it processed was IDCT-only or if it had motion compensation data associated with it. The IDCT component may detect IDCT-only data according to an identifier attached to the data by the software driver, as discussed in step 455. If the data is not IDCT-only data, indicating it has associated motion compensation data, the IDCT component may perform according to a first mode of operation, as previously discussed in FIG. 1.

According to the first mode of operation, the IDCT component functions to prepare the IDCT data to be processed along with motion compensation data in a processing component, such as 3D pipe 124 (FIG. 1). Accordingly, in step 485, the IDCT component stores the IDCT results in memory. In one embodiment, the IDCT results are 9-bit values. Due to memory spaces being allocated in 8-bit segments, 16-bit spaces are allocated for the values of the IDCT results. In step 495, the IDCT component sends an interrupt to the software driver indicating that the IDCT data has been processed and to request that the associated motion compensation vector data be sent to the processing hardware. The processing component can then process the motion compensation vector data with the stored IDCT results to generate the image data to store in the frame buffer.

Alternatively, in step 470, the IDCT component may determine the processed IDCT data has no associated motion compensation data. The IDCT component can process the data according to a second mode of operation. In the second mode of operation, the IDCT component can perform optimizations related to IDCT-only image data. The processing component, 3D-pipe 124 (FIG. 1) can be bypassed. The processed IDCT data can also store the IDCT results into frame buffer memory, freeing up the space associated with IDCT results 134 (FIG. 1) in the first mode of operation. However, since the IDCT results are generally 9-bit values, the results must be converted to 8-bit values to store them as displayable image data in the frame buffer. Accordingly, in step 480, the IDCT results are converted to 8-bit values. In one embodiment, converting the results to 8-bits includes adding a bias value to the results and clamping the results to 8-bit values. Following the second mode of operation, in step 490, the converted results are stored directly in the frame buffer. The IDCT component can send a notification to the software driver, notifying it to send more IDCT data or to indicate the stored image frames are ready to be displayed.

Figure 5:
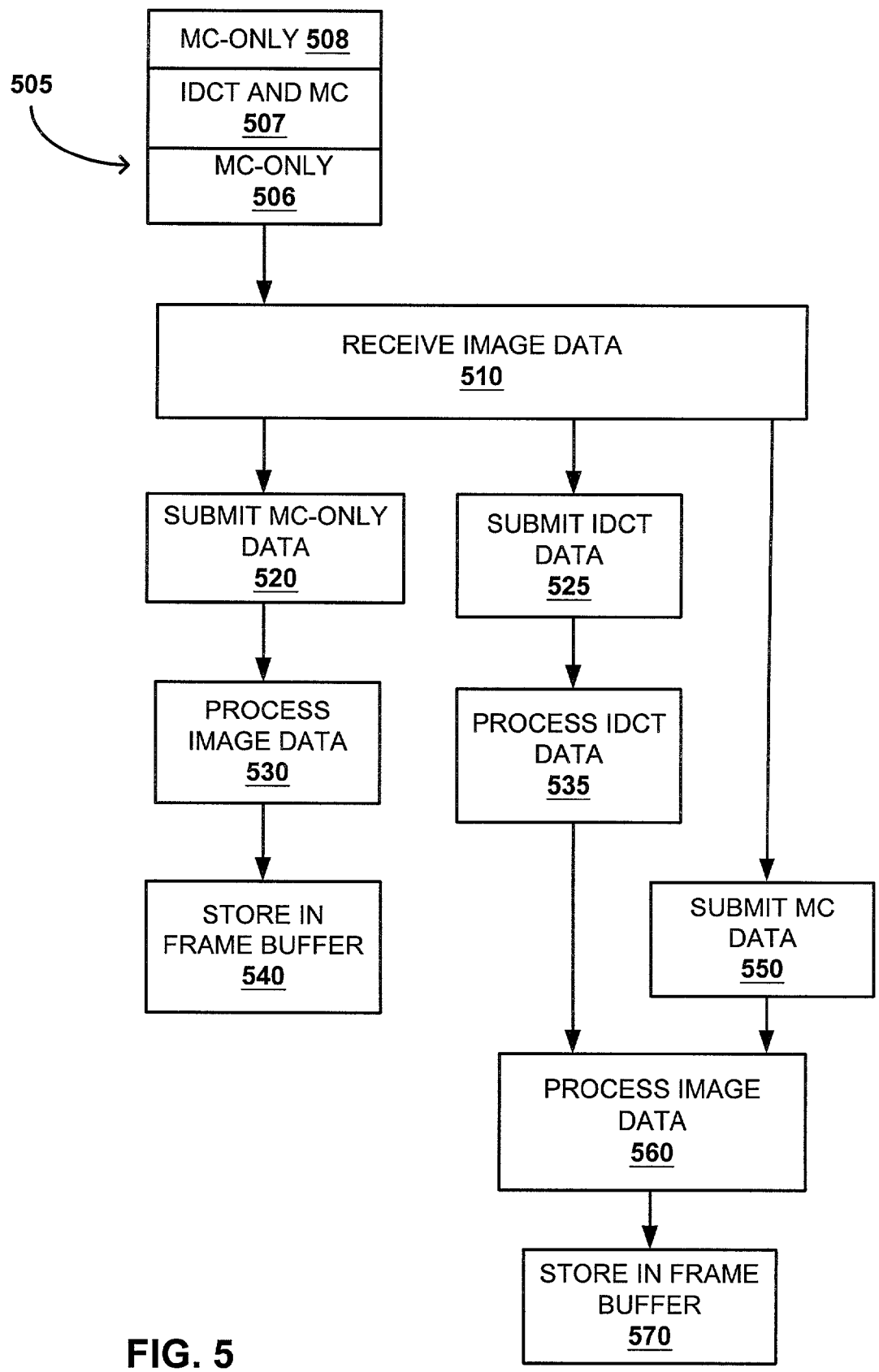
FIG. 5 is a flow diagram illustrating steps for optimizing image processing for image data associated with only motion compensation vector data, according to one embodiment of the present invention.

Referring now to FIG. 5, a flow diagram describing the steps taken to optimize image processing for image data containing only motion compensation data is shown, according to one embodiment of the present invention. As previously discussed, I-frames are used as reference for P-frames and B-frames in motion compensation. P-frames and B-frames can use motion compensation vectors to indicate the motion of a block in a reference frame to the current frame. P-frames and B-frames can also use error correction data to indicate differences in image information between a referenced block and a current block.

As previously discussed in FIG. 1, error correction data is represented using IDCT coefficients. The IDCT coefficients are processed by an IDCT component, such as IDCT component 122 (FIG. 1), to reproduce the error correction data. Motion compensation vector data is processed using a processing component, such as 3D pipe 124 (FIG. 1). In one embodiment, when IDCT coefficients are included with the motion compensation data, the IDCT component must first process the IDCT coefficients. The 3D pipe is then used to process the motion compensation vector data with the processed IDCT results (i.e. error correction data).

A frame of video may be composed of image blocks that are entirely composed of motion vectors, with no error correction data. For example, the video being represented may be of a simple bouncing ball. If the background does not change, a large portion of the frame can be simply represented using motion compensation vectors. If the ball is the only part of the frame that is changing, only a small subset of blocks would involve both IDCT coefficients and motion compensation vectors. The 3D pipe can then be used to process the pure motion compensation areas without waiting for IDCT results to be processed. In one embodiment, the image data associated with only motion compensation vector data is submitted to the 3D pipe. The motion compensation data with associated IDCT data can be withheld while other motion compensation data is processed, allowing the IDCT coefficients to be processed by the IDCT component, concurrently with other motion compensation data being processed in the 3D pipe.

In step 510, a software driver receives image data referring to blocks within a frame 505. Frame 505 includes blocks that contain only motion compensation vector data, motion compensation only blocks 506 and 508. Among motion compensation only blocks 506 and 508 is a block with both IDCT coefficients and motion compensation vector data, IDCT and motion compensation block 507. In one embodiment, the received image data is stored in buffers. In step 520, the software driver submits the motion compensation vector data associated with the motion compensation only blocks 506 and 508 to the 3D pipe in processing hardware. In step 525, the software driver submits the IDCT coefficients from IDCT and motion compensation block 507 to the IDCT component in the processing hardware. The motion compensation data associated with IDCT and motion compensation block 507 can be withheld in the buffer, allowing the motion compensation blocks 506 and 508 to be processed. In step 530 the 3D pipe processes the submitted motion compensation vector data. In step 535, the submitted IDCT data is processed by the IDCT component. In one embodiment, step 535, submitting the IDCT data, is performed concurrently with the motion compensation data being processed in step 530, allowing the IDCT data from the IDCT and motion compensation block 507 and the motion compensation vector data from the motion compensation only blocks 506 and 508 to be processed in parallel. The processed IDCT data is stored in memory, such as in IDCT results 134 (FIG. 1).

In step 540, after being processed by the 3D pipe, the image data associated with motion compensation blocks 506 and 508 are stored in a frame buffer. In step 550, the software driver submits the motion compensation data associated with IDCT and motion compensation block 507 to the 3D pipe. The software driver may include an identifier with the motion compensation vector data, notifying the 3D pipe to read the associated IDCT data that has already been processed by the IDCT component. In one embodiment, the identifier is the address in which the processed IDCT data is stored, allowing the 3D pipe to simply access the provided memory address to read the processed IDCT data. In step 560, the 3D pipe processes the motion compensation vector data associated with IDCT and motion compensation block 507 (submitted in step 550) along with the processed IDCT data from step 535. In step 570, the processed image data related to IDCT and motion compensation block 507 is stored in the frame buffer. By processing the data from the blocks that only contain motion compensation data concurrently with the IDCT data from other blocks, the idle time of the 3D pipe is reduced. Accordingly, the 3D pipe does not wait for completed IDCT results to process image data, allowing it to process other image data.

Figure 6:
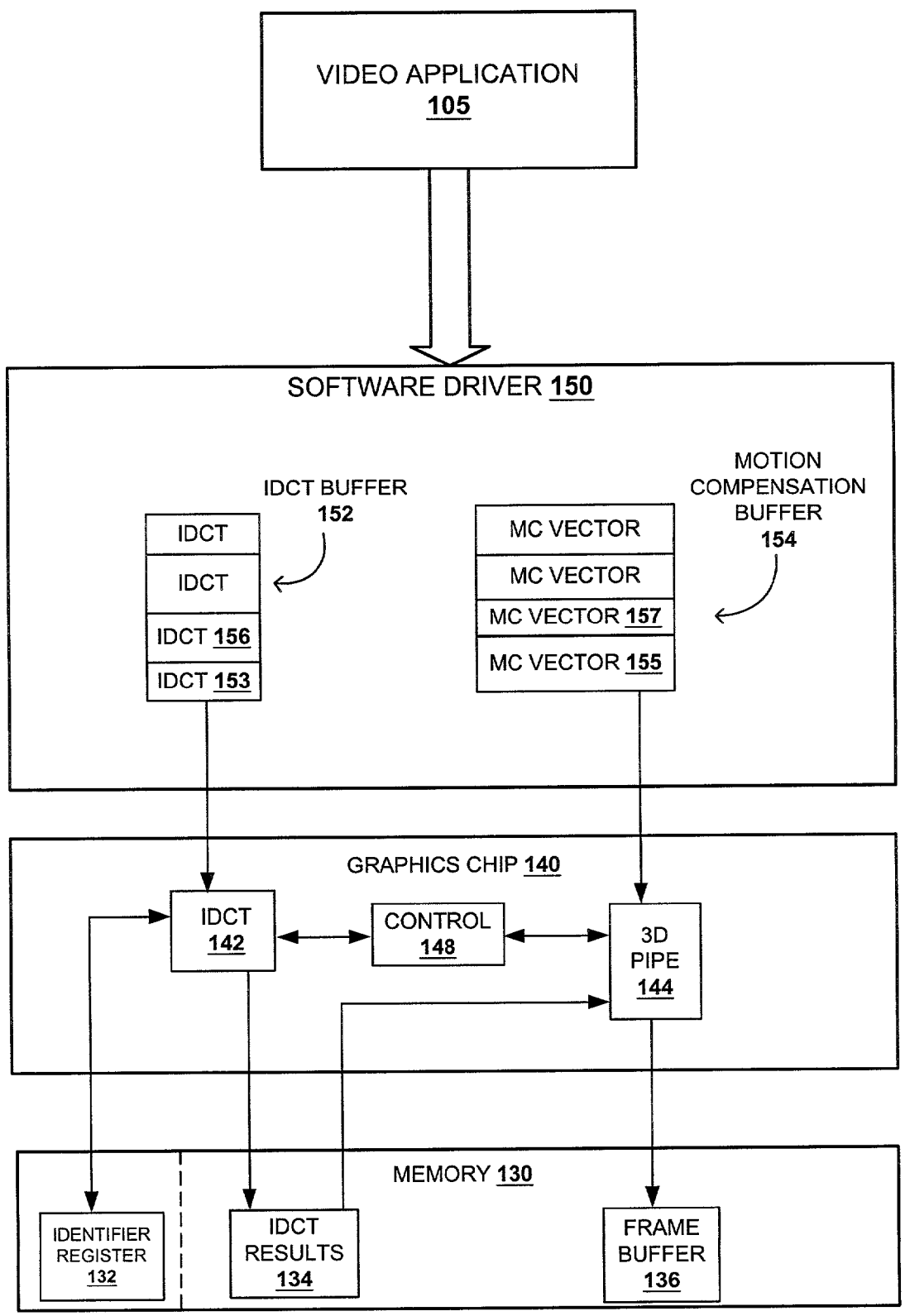
FIG. 6 is a block diagram illustrating a system for handling video data using semaphores, according to one embodiment of the present invention.

Referring now to FIG. 6, a video processing system for collecting and processing motion compensation video data is shown using a semaphore, according to one embodiment of the present invention. Software driver 150 handles video requests generated by an application program, such as video application 105, and routes the video requests to graphics chip 140 where they can be processed. As previously discussed, video application 105 can include video applications such as digital video disk (DVD) player software, a digital television tuner, an application programming interface (API), video decoding software, or video gaming console.

In one embodiment, software driver 150 stores inverse transformed error correction data, such as IDCT coefficients sets 153 and 156, in an IDCT buffer 152. Software driver 150 stores motion compensation (MC) vector data, such as MC data sets 155 and 157, in an MC buffer 114. The stored inverse transformed error correction data and MC data are held in buffers 112 and 114, respectively, until being sent to graphics chip 140.

Graphics chip 140 includes an IDCT component 142, similar in function to IDCT component 122 (FIG. 1), for processing IDCT data sets sent from software driver 150. In one embodiment, processed error correction data from IDCT component 142 is stored in IDCT results 134 of memory 130. Graphics chip 140 also includes a 3D pipe 144, similar in operation to 3D pipe 124 (FIG. 1), for processing MC data sets sent from software driver 150. In one embodiment, 3D pipe 144 processes the MC data sets with processed error correction data stored in IDCT results 134.

Processed video data generated by 3D pipe 144 is stored in a frame buffer 136. As will be discussed further, a control component 148 is used to track the processing of motion compensation vector data and related error correction data. In one embodiment, control 148 includes a semaphore to halt the processing performed by 3D pipe 144, until error correction data has been received by IDCT component 142.

Software driver 150 coordinates the delivery of transformed error correction data to IDCT component 142, as well as the delivery of related motion compensation vector data to 3D pipe 144. According to one embodiment, the motion compensation vector data related to the transformed data cannot be processed until the inverse transformed error correction data has been processed into error correction data. In the embodiments described in FIGS. 1–5, interrupt-based methods are described wherein software driver 120 (FIG. 1) is issued interrupts from components 122 and 124 (FIG. 1), indicating when a set of data has been processed. For example, IDCT component 122 may issue an interrupt indicating a unique identifier of processed error correction data. Using the unique identifier, software driver 110 (FIG. 1) can issue related motion compensation data to 3D pipe 124 (FIG. 1).

In an alternate embodiment, semaphore-based methods may be employed, wherein a semaphore in control component 148 is used by components 142 and 144 of graphics chip 140, to track and control the processing of received data. Semaphores describe protected variables, or registers, used to restrict specific processes. Access to alter the value of the semaphore is generally made through specific commands. In one embodiment, software driver 150 includes commands to alter a semaphore value, within graphics chip 140, when submitting transformed error correction data to IDCT component 142. Software driver 150 also includes a command with the motion compensation vector data indicating to 3D pipe 144 to wait until the value of the semaphore is incremented. For example, software driver 150 sends both sets of transformed error correction data, such as IDCT coefficients set 153, and motion compensation vector data, such as MC data set 155, to graphics chip 140, including the semaphore commands described.

In one embodiment, while 3D pipe 144 may have received motion compensation vector data, 3D pipe 144 waits until the value of the semaphore has been incremented. IDCT component 142 increments the semaphore value once IDCT component 142 receives the inverse transformed error correction data with the semaphore command. It should be noted that the semaphore value is incremented once the command to alter the semaphore value is received by IDCT component 142 and is performed regardless of whether the inverse transformed error correction data sent has been fully processed. Once the semaphore value has been incremented, 3D pipe 144 begins to process the motion compensation vector data, taking for granted that the related error correction data has already been processed. Once 3D pipe 144 has processed the motion compensation vector data, 3D pipe 144 can decrement the value of the semaphore, returning the semaphore to its original state, prior to increment by IDCT component 142. In one embodiment, altering the value of the semaphore includes incrementing the value of the semaphore so that, when incremented, the semaphore allows motion compensation vector data to be processed by 3D pipe 144. In a specific embodiment, the semaphore alternates between an asserted state in which the semaphore halts processing by 3D pipe 144, and an unasserted state in which the semaphore allows processing to be performed by 3D pipe 144.

It should be noted that if the increment commands related to the semaphore value are provided immediately after the transformed error correction data is issued, the increment in the semaphore value does not necessarily indicate the transformed error correction data has been fully processed. Accordingly, software driver 150 may need to account for the latency associated with processing in components 142 and 144. For example, software driver 150 may need to include "dummy" commands with the data to provide added latency to a receiving component, such as IDCT component 142. In another embodiment, the command to increment the semaphore value is provided at a later period of time after the IDCT coefficient sets are provided to IDCT component 142. In an alternate embodiment, a delay is applied by hardware, such as graphics chip 140. A counter or timer (not shown) may be used by control 148 or IDCT component 142 before altering the semaphore value. Applying a delay for incrementing or altering the semaphore value insures that 3D pipe 144, does not grab error correction data values from memory, such as IDCT results 134, before they have been fully processed by IDCT component 142. It will be appreciated that unique identifiers, as described for the interrupt-based embodiment, may also be employed using semaphores in graphics chip 140. Identifiers corresponding to processed error correction data sets can be stored in memory, such as in identifier register 132. Control 148 can then be used to track the sets of processed data, and issue semaphore values to allow associated motion compensation data to be processed through 3D pipe 144. It will be appreciated that the selection of a semaphore-based implementation over an interrupt-based implementation may be made without departing from the spirit or scope of the present invention.

Figure 7:
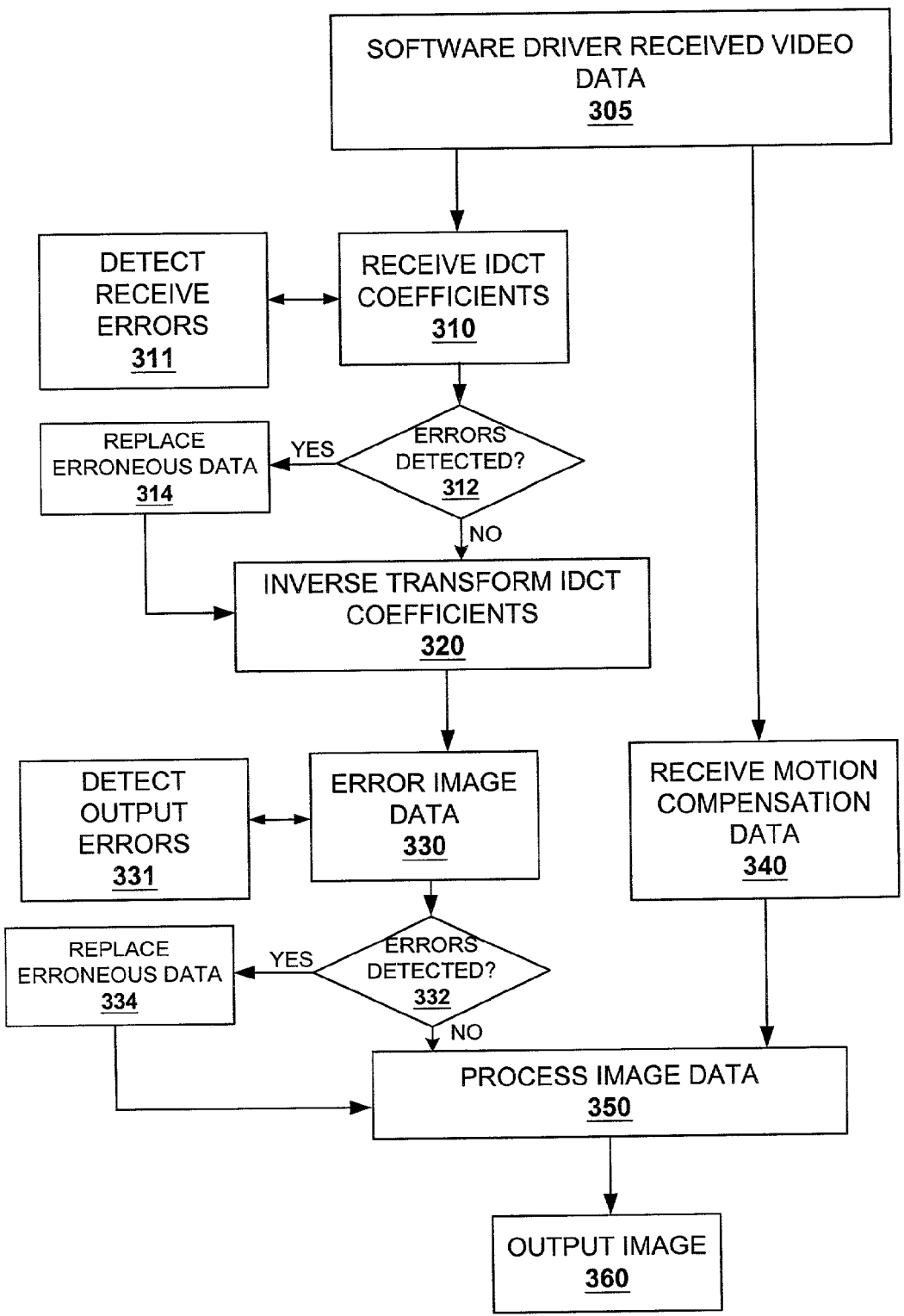
FIG. 7 is a flow diagram illustrating steps for processing video data and handling errors in hardware, according to one embodiment of the present invention.

Referring now to FIG. 7, a flow diagram illustrating a method for processing video data and handling errors in transformed error correction data. As previously discussed, frames of video are processed using motion compensation vectors and error correction data. In one embodiment, the transformed error correction data is processed through a DCT transform to generate IDCT coefficients. The IDCT coefficients are processed in hardware, such as through IDCT component 122 (FIG. 1). Errors present in the IDCT coefficients may cause the IDCT component to become stalled, delaying the presentation of video data and forcing multiple frames of video data to be skipped. The diagram shown in FIG. 7 is similar to the diagram shown in FIG. 3, with the exception of steps 311–314 and steps 331–334 relating to detecting and controlling error-characteristics. It should be noted that reference is made herein to error correction data and errors. Error correction data is used herein to refer to image data used to correct differences between predicted blocks of image data and a target block of image data. The error correction data is used to replace discrepancies between the blocks predicted through motion compensation vectors and the target data blocks, using image data. Errors are used to refer to events that cause erroneous error correction data to be reported. Furthermore, error-characteristics refer to characteristics related to the received error correction data, such as underflow or overflow error characteristics, resulting from the errors.

In step 305, a software driver, such as software driver 110 (FIG. 1) receives video data. The source of the video data may be a multimedia application, such as video application 105 (FIG. 1). In one embodiment, the software driver stores IDCT coefficients and motion compensation vector data related to the video data in data buffers, such as buffers 112 and 114 (FIG. 1) before releasing the video data to video processing hardware. In step 310, the IDCT coefficients are received by a hardware component, such as in IDCT component 122 (FIG. 1). In one embodiment, the IDCT coefficients are used to generate full macroblocks of error correction data. Four sets of Luma (Y) data and two sets of Chroma (one U and one V) data are received for processing through an inverse transform. In one embodiment, the sets of data represent 8 by 8 blocks of pixel data.

In step 311, the received blocks of error correction data are analyzed to determine if errors were present. The blocks are analyzed for error-characteristics, such as overflow and underflow. In one embodiment, receiving hardware may not receive an indication that all the data referring to a block of image data has been sent. In such a case, the receiving hardware may continue attempting to store data into the block. If attempts are made to store more data in the block than is designated by the size limitation of the block, an overflow error is detected. Underflow errors may also result when the software driver has sent all the data within its data buffers, but hardware has not completed the macroblock, for example due to transmission error.

In one embodiment, error indicators, such as register flags are set indicating the error-characteristics. Separate flags may be used for different error-characteristics. For example, a first flag may be set to indicate an underflow error and a second flag may be used to indicate an overflow error. In another embodiment, different channels, or streams, of error correction data may be received and processed by hardware in parallel. Separate flags may be used to indicate the channel carrying the erroneous data. In another embodiment, interrupts are generated by the processing hardware to indicate errors have been detected. In one embodiment, the flags are set until they are cleared through the software driver. The software driver may acknowledge an error by clearing the error flag. Once the software driver has acknowledged the error, the software driver might clear data, stored in its data buffers, associated with a problem stream corresponding to the error, to avoid further errors.

In step 312, if no errors were detected, the sets of blocks are passed to step 320. Otherwise, if errors were detected, step 314 is performed, before proceeding to step 320. In step 314, the blocks of error correction data may be manipulated to avoid system stalling. In one embodiment, extraneous data resulting from overflow errors is ignored and only the data used to complete the data block is used. Alternatively, the block associated with an overflow error may be filled with zeros. Blocks associated with underflow errors may be completed using predefined values, such as all zeros.

In step 320, the completed blocks are processed by an inverse transform component to generate an image error correction data. In step 330, the processed error correction data is stored as image data. In step 331, errors associated with the writing of the error correction data to memory are detected. In one embodiment, the memory used to store the errors is limited, and if attempts are made to write data past an upper memory bound an address overflow error is detected. An error indicator may be provided to indicate an error has occurred.

In step 332, it is determined if any errors were detected during the storing of the data to memory in step 330. If no errors were detected, the data is not changed and is allowed to be processed 'as is'. Instep 334, if errors were detected, the set of error correction data associated with an error is treated to avoid problems due to erroneous data. In one embodiment, treatment includes replacing the set of error correction data associated with the error with zeroes. In another embodiment, treatment includes ignoring extraneous data due to an overflow characteristic.

In step 340, processing hardware receives the motion compensation vector data related to the error correction data. In step 350, the stored error correction data and the motion compensation error correction data are processed together to generate image data. In one embodiment, the image data is used to complete a frame of video. In step 360, the completed image data is output. In one embodiment, the image data is presented as part of video and output to a display. The image data may also be stored in memory, such as in a frame buffer, and combined with sets of image data.

Figure 8:
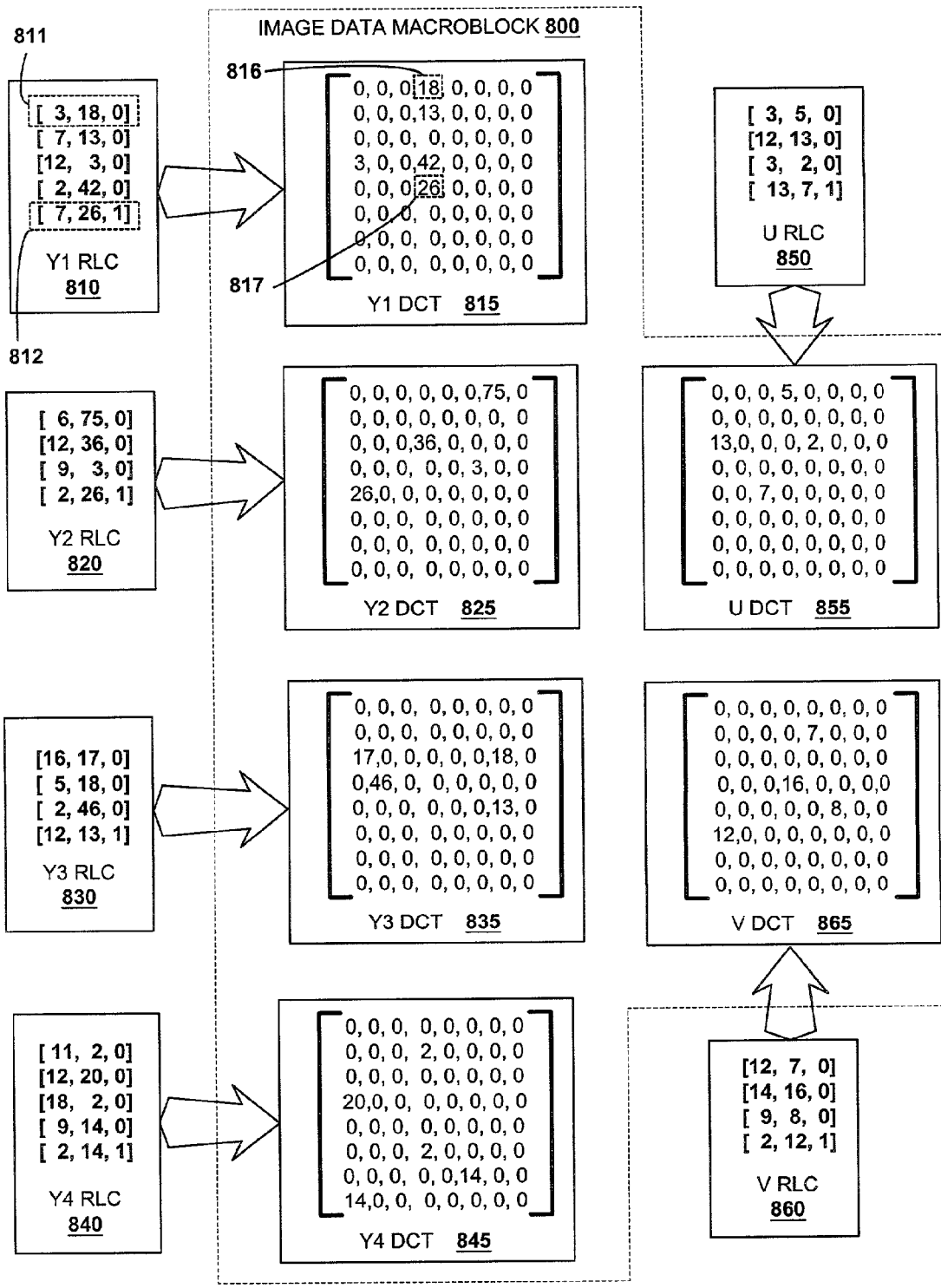
FIG. 8 is a diagram illustrating a method for representing and processing transformed error correction data, according to one embodiment of the present invention.

Referring now to FIG. 8, a diagram illustrating a method for representing and processing transformed error correction data is shown, according to one embodiment of the present invention. As previously discussed, in one embodiment, every macroblock (16×16 pixels) of image data 800 includes four blocks (8×8 pixels) of Y data, such as Y data blocks 815, 825, 835 and 845, one block of U data, such as U data block 855, and one block of V data, such as V data block 865. The blocks 815, 825, 835, 845, 855 and 865 are processed through a transform, such as a DCT. The results of the transform may then be used as coefficients for an inverse transform to be processed back into image data.

In one embodiment, the transformed error correction data are encoded using run-level encoding. The transformed error correction data generally includes many zeros with only a few non-zero values. Run-level encoding is a method of encoding data including sending a value indicating the non-zero value and another value indicating the number of zeros before the non-zero value. For example, run-level command 811, of the first Y run-level command set 810, indicates '3' zeros before the non-zero value of '18'. Accordingly, the value of '18' follows three zeros in the first Y DCT data block 815, as shown with data byte 816.

A third value of the run-level command may be used to indicate the continuation or end of a block of data. For example, the third value, an end-of-block value, of run-level command 811 is a '0' and may be used to indicate that more data related to first Y DCT data block 815 will be sent. An end-of block value of '1' may be used to indicate the end of a data block. For example, the end-of-block value of run-level command 812 may be used to indicate the end of first Y DCT data block 815, indicating that the value of '26' follows '7' zeros, and is the last non-zero value. Accordingly, hardware may make up the rest of first Y DCT data block 815 using zeros, as are shown following data byte 817.

Remaining blocks of data related to the macroblock of image data 800 being processed may be constructed using the same procedure. Run-level command sets 820, 830, 840, 850 and 860 may be used to respectively reconstruct second DCT data block 825, third DCT data block 835, fourth DCT data block 845, UDCT datablock 855 and VDCT datablock 865. However, errors in the run-level command sets 810, 820, 830, 840, 850 and 860 may cause underflow or overflow errors when hardware attempts to reconstruct DCT data blocks 815, 825, 835, 845, 855 and 865.

As previously discussed, overflow errors may occur when the DCT data is written beyond the space allocated for the DCT data block it is related to. This may occur due to errors in the run-level command set. For example, while, run-level command 812 uses a '1' as its end-of-block value to indicate the last non-zero value of first Y DCY data block 815, the end-of-block value of run-level command 812 may be reported erroneously as a '0'. The error may be due to transmission error or the receiving hardware or transmitting hardware may be stuck in a low level state due to the previous '0' values. Accordingly, hardware may read a '0' believing more data should follow. As run-level commands are received from a new command set, such as second Y run-level command set 820, the hardware may attempt to store the data related to the new command set in first Y DCT data block 815.

As new data continues to be combined in the old data block, the old data block may become full and further attempts to write to it would result in data being written outside of its boundaries. As hardware is aware of the set size of the DCT blocks, attempts to write outside of the boundaries of a DCT data block may trigger an overflow error. Once an overflow error is received, the remaining data may be ignored and the data block is left with the old data. In another embodiment, any extra data is wrapped around, replacing old data previously stored in the DCT data block. Alternatively, the entire DCT data block related to the overflow error may be set to some predetermined pattern. For example, in one embodiment, the erroneous DCT data block is cleared, setting all the values within the DCT data block to zeros. Other errors may lead to overflow error-characteristics. Alternatively, the entire DCT data block related to the overflow error may be set to a set of values which will may not stall hardware during processing. For example, if the number of preceding zeros indicated by the run-level command is erroneously high, the DCT data block being constructed may overflow.

Errors may also lead to underflow. If some commands within the run-level command sets are not properly received, such as run-level command 812, the DCT data blocks may not be completed. In conventional systems the hardware may remain stalled as it awaits more run-level commands. To alleviate this problem, one embodiment of the present invention provides for hardware to complete the DCT data blocks using predetermined patterns of values. For example, once all the data regarding a current macroblock of image data being processed is sent to hardware, and the DCT data blocks are not complete, hardware determines an underflow error has occurred and fills the incomplete data blocks with zeros.

Figure 9:
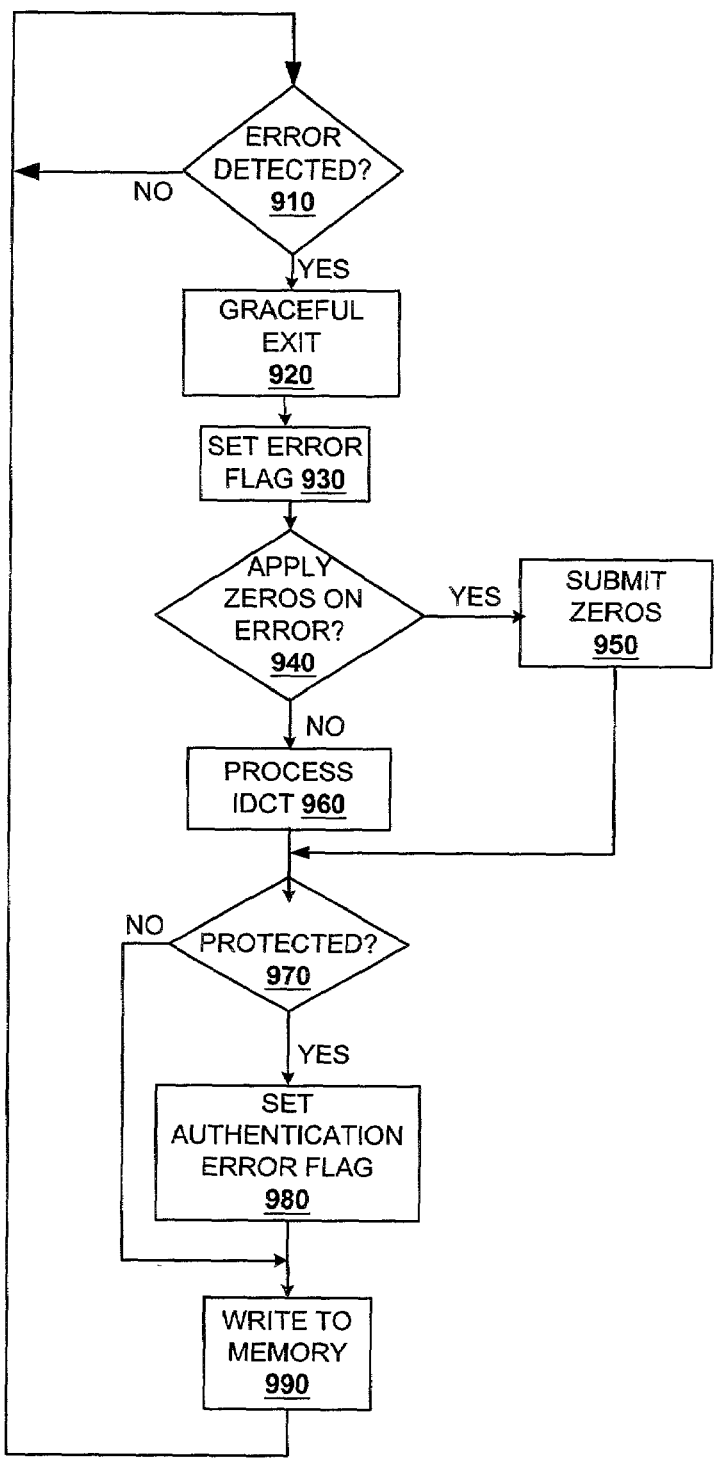
FIG. 9 is a flow diagram illustrating a method for handling errors in transformed error correction data received by an inverse transform component, according to one embodiment of the present invention.

Referring now to FIG. 9, a flow diagram illustrating a method for handling error-characteristics is shown, according to one embodiment of the present invention. As previously discussed, errors in the IDCT coefficients received by a processing component, such as IDCT component 122 (FIG. 1) may cause hardware to stall when processing image data. In one embodiment, to reduce the stalling of hardware, errors are detected and erroneous data is altered.

In step 910, received data blocks are checked to determine whether any error-characteristics are present. In one embodiment, error-characteristics include overflow and underflow of data being processed into data blocks, as previously discussed in reference to FIG. 8. If no errors are detected, processing resumes as normal, waiting for the next set of IDCT coefficients. In step 920, if an error was detected, a "graceful exit" is performed. The sending of IDCT coefficients by software and the receipt of IDCT coefficients in hardware may be paused to prevent errors from continuing to be processed.

In step 930, an error indicator is provided as notification that an error has occurred. In one embodiment, the error indicator includes an error flag, which is set to indicate the error has occurred. Separate flags may be used to identify different error-characteristics. For example, a first flag may be used to identify an overflow; while, a second flag may be used to identify an underflow. In one embodiment, multiple channels of IDCT coefficients are received from software and processed in parallel. The multiple channels may be related to different video streams being displayed. Separate error flags may be used to identify error-characteristics of particular channels. For example, a third flag may identify a first channel with an overflow; and a fourth flag may identify a second channel with an underflow. In one embodiment, the error flags are set by hardware and polled by a software driver to determine which errors exist. The software driver clears the error flags to acknowledge the errors that have occurred. In another embodiment, the error indicator includes an interrupt, generated by hardware, to notify the software driver that an error has occurred.

In step 940, an option to apply predetermined values, such as all zeros, to the erroneous IDCT data blocks is considered. The option may be set by software by asserting a setting to a hardware register. If the option to apply predetermined values is disabled, the current IDCT blocks are left alone and processed in step 960. For example, if desired, data in data blocks related to overflow errors may be processed with the possibly erroneous data received. While the data stored resulted in an overflow, it may be desirable to process the data regardless, allowing at least some of the data which was correct to be processed. The extraneous data related to the overflow may be ignored. In another embodiment, the extraneous data is used to replace old data previously stored in the data block. In the case of underflow, while the received data is kept in the stored data block, the rest of the data block may be filled with zeros to complete the data block.

In step 950, if the option to apply predetermined values is selected, the entire data block associated with the error is set to a predetermined value. In one embodiment, the data block is cleared, setting all the values of the data block to zeros. It will be appreciated that other predetermined data sets or functions may be used to reset the values of the erroneous data blocks. Since dealing with error-characteristics, such as overflow, may lead to unpredictable processing, step 950 allows the erroneous data to be reset to a set of values, which may be safer to process.

In step 970, the received data is analyzed to determine if the data was protected, such as through encryption or other encoding methods. Hardware may check whether any encryption keys were assigned to process the received data. If keys were assigned, the data is considered protected and software is notified to perform re-authentication. If the data is not considered protected, the current IDCT data blocks may be written to memory, as in step 990.

In step 980, an authentication error indicator, such as a flag or hardware generated interrupt, is used to report any errors related to a protected channel. By comparing the scrambling assigned to the data, the channel may be identified. Scrambling refers to encryption methods or keys used to protect data within a particular channel. For example, data assigned to a first encryption key value may be identified as a first channel. In another embodiment, the software driver associates stream identifiers with data submitted to hardware. The stream identifiers identify sets of data belonging to different channels. Software may use the flag to determine which of the channels must be re-authenticated for encryption. In one embodiment, software is used to poll the flags. A flag register may be used in which different pins represent individual channels of video data being sent. The individual pins may be polled to determine the channel associated with the error. The software driver may clear the data stored in a data buffer for the channel associated with the error. Re-authentication may also be needed to generate and/or assign new encryption key values for protecting the video data sent between the software driver and processing hardware. Interrupts may also be hardware generated to report the erroneous data channels to software. In step 990, the current IDCT data block data is written to memory. It will be appreciated that other steps may be described and other functions may be performed on the received data without departing from the scope of the present invention.

Figure 10:
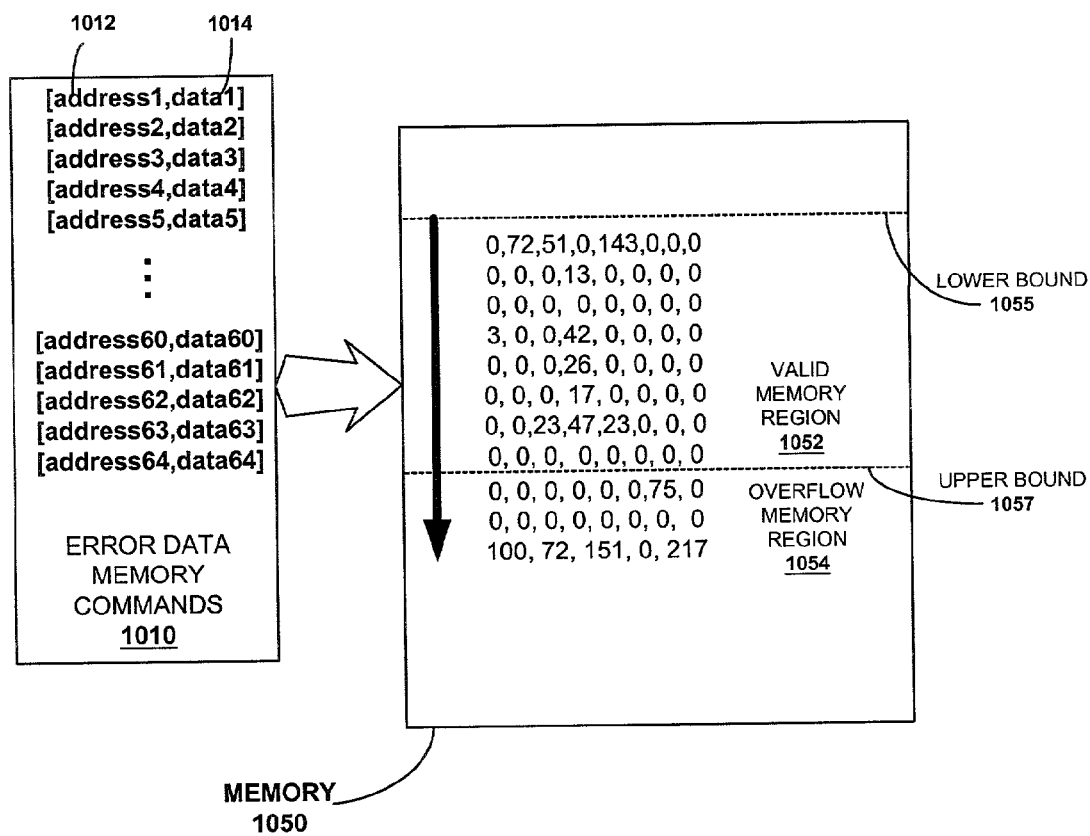
FIG. 10 is a diagram illustrating invalid data storage, according to one embodiment of the present invention.

Referring now to FIG. 10, an error characteristic that may occur when writing processed IDCT data to memory is described, according to one embodiment of the present invention. Data blocks are written to memory 1050 in fixed sets. The amount of memory 1050 allocated for the fixed set is bounded by specific addresses, such as valid memory region 1052, between lower bound 1055 and upper bound 1057. An error characteristic may be determined by analyzing the addresses, such as address 1012, in which data, such as data 1014, is being written.

As previously discussed, received IDCT coefficients are processed into sets of error correction data. The sets of error correction data are generally processed into separate data blocks. The separate data blocks relate to Y data, U data, and V data. The processed sets of error correction data are sent to a memory writer. The memory writer converts the error correction data into memory commands 1010. Memory commands 1010 are then received by memory 1050 to store the error correction data. Memory commands include data, such as data 1014, to be stored in memory 1050 and a memory address, such as address 1012, at which to store the data.

Errors within commands to write image data into memory may cause the data to become misrepresented in memory 1050. For example, the run-level commands may miss an end of block command, as described in reference to FIG. 8. Misrepresentations of the run-level commands may result in extraneous data being stored through memory commands 1010. The extraneous data in memory commands 1010 may cause attempts to store data outside of valid memory region 1052. In one embodiment, the upper bound 1057 is determined by adding the total amount of memory space needed, to an offset such as lower bound 1055 provided by the memory writer. Since upper bound 1057 may be known by processing hardware, memory outside of valid memory region 1052 may be considered an overflow memory region 1054. Accordingly, error correction data memory commands 1010 with addresses greater than overflow region 1054 may indicate errors have been received. Once detected, the data set related to the errors may be treated to avoid crashing a system using memory 1050, due to the data being written to unknown memory space, such as overflow memory region 1054.

Figure 11:
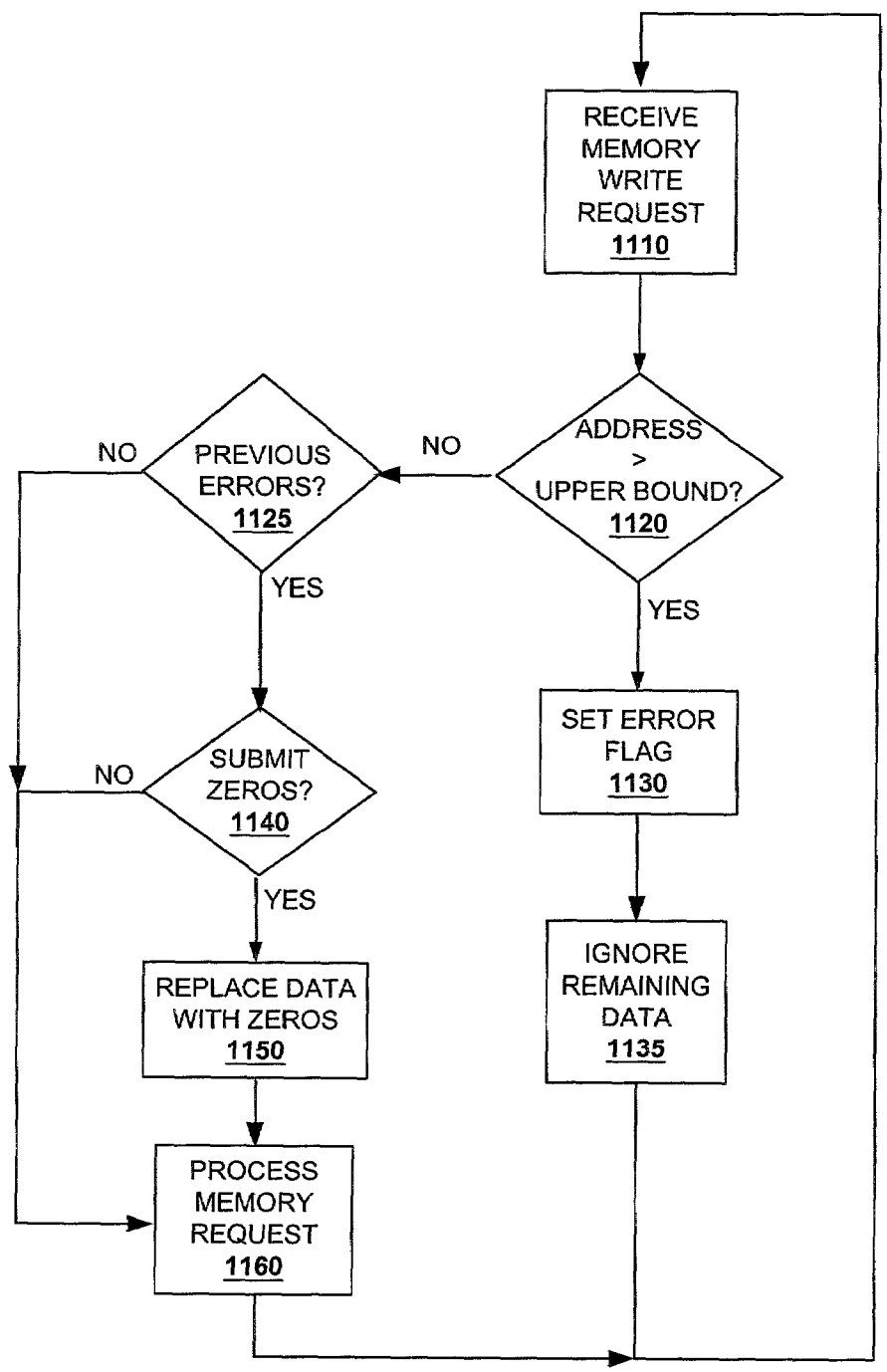
FIG. 11 is a flow diagram illustrating a method of handling errors in image error correction data being written to memory, according to one embodiment of the present invention.

Referring now to FIG. 11, a flow chart illustrating methods for handling error-characteristics when writing IDCT results to memory is shown, according to one embodiment of the present invention. As described in reference to FIG. 10, overflow may result from errors in processed IDCT data being written to memory. By detecting errors, the data can be handled to reduce the effect of the errors on processing hardware.

In step 1110, a memory writer generates a memory-write request. The IDCT results are converted to memory-write requests. The memory commands are used to write the IDCT results as a block of image error correction data. In one embodiment, a memory address is included with the data being written, specifying the memory address to write the data. In step 1120, the memory address is compared to an upper bound of a memory region. The upper bound may be provided by an application or software driver. The value of the upper bound may be stored in a register for comparison. If the memory address is less than or equal to the upper bound, the request is accepted and processed, returning to step 1110 to analyze the next request. If the memory address of the request is greater than the upper bound, an overflow will occur. In step 1130, an error indicator is provided to report the detected overflow. The error indicator is used to notify a hardware component, such as IDCT component 122 (FIG. 1), of the error. In one embodiment, the error indicator includes an error flag set to indicate an error has occurred. The error flag may be polled to determine if an error has occurred. Alternatively, the error indicator may include an interrupt generated to report the detected error. In step 1135, the hardware component ignores remaining data associated with the macroblock. Since the upper bound of valid memory was reached, the remaining data may be considered erroneous. Accordingly, the remaining data is dropped and hardware returns to step 1110 to receive a new memory write request.

In step 1120, if the address of the data being written to memory is not greater than the upper bound, previously set error flags are checked. In step 1125, error flags associated with the IDCT results before being sent to a memory writer are checked, such as errors flagged from an IDCT processing component (step 930, FIG. 9). If no previously set errors are detected in step 1125, the memory write request is processed as in step 1160. In step 1160, the data associated with the memory write request is written directly to memory. If previously set errors are found in step 1125, it is determined if an option to submit zeroes in place of the erroneous data is set as in step 1140. In step 1140, if the option to submit zeroes in place of erroneous data is set, the data in the memory write request is set to zero as in 1150. Once the data has been set to zero in step 1150, the memory write request is processed in step 1160, allowing the zeros to be written to memory in place of the erroneous data.

If the option to submit zeroes is not detected during step 1140, the memory write request is written directly to memory. In step 1160, the memory request is processed regardless of any errors associated with the data. While an error flag was set for the data, the some of the data may still be useful for video processing. The option to submit zeroes in place of erroneous data may be enabled/disabled through settings to hardware registers. While zeros may be erroneous in comparison to the original image data being represented, zeros will not stall hardware processing when the data is combined with motion compensation vector data. Other functions may be provided to nullify the data in the macroblock and prevent overflow without departing from the scope of the present invention.

FIGS. 7–11 illustrate specific embodiments of the present invention for handling error-characteristics which may occur during the processing of transformed error correction data. FIG. 7 is a flow diagram illustrating steps to process video data and handle errors related to IDCT data being processed in hardware. FIG. 8 illustrates a method of processing run-length coding commands to represent IDCT coefficients in hardware. FIG. 9 is a flow chart illustrating a method of handling errors related to receive IDCT coefficients being processed. FIG. 10 illustrates memory being written to hardware to describe a method of determining errors have occurred. FIG. 11 is a flow chart illustrating steps to detect and handle errors related to the storage of processed IDCT data in memory. While reference has been made herein to using hardware to detect errors that have occurred, the methods may be performed through software used to monitor the status of image processing hardware.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
performing error detection on received transformed data;
determining if an error has been found in the transformed data;
determining if the error is associated with a set of protected data; and
identifying a channel associated with the error if the error is associated with a set of protected data.

2. The method as in claim 1, wherein determining if an error has been found includes identifying an error flag which has been set.

3. The method as in claim 2, wherein a plurality of flags is polled to determine if an error has been found.

4. The method as in claim 1, wherein determining if an error has been found includes receiving an interrupt indicating an error has occurred.

5. The method as in claim 1, wherein determining if the error is associated with a set of protected data includes identifying an encryption key assigned to the set of protected data.

6. The method as in claim 5, wherein identifying a channel associated with the error includes identifying a channel assigned an encryption key register.

7. The method as in claim 1, further including performing corrective measures to reduce errors related to new data.

8. The method as in claim 7, wherein corrective measures include clearing data buffers.

9. The method as in claim 7, wherein corrective measures include re-authenticating encryption.

10. A computer readable medium tangibly embodying a program of instructions to manipulate a data processor to:
determine if an underflow error or overflow error of transformed error correction data has occurred;
apply corrective measures when an underflow error or overflow error has occurred; and
identifying errors related to protected data.

11. The computer readable medium as in claim 10, wherein determining if the underflow error or overflow error has occurred includes detecting an interrupt generated in response to an underflow error or overflow error.

12. The computer readable medium as in claim 10, wherein determining if the underflow error or overflow error has occurred includes determining if a flag has been set in response to an underflow error or overflow error.

13. The computer readable medium as in claim 12, wherein the flag is cleared once it has been read.

14. The computer readable medium as in claim 12, wherein individual flags of a plurality of flags are polled to determine if an error has occurred.

15. The computer readable medium as in claim 14, wherein the individual flags relate to different error characteristics.

16. The computer readable medium as in claim 15, wherein the error characteristics include error types.

17. The computer readable medium as in claim 10, further including determining an error characteristic associated with the underflow error or overflow error.

18. The computer readable medium as in claim 17, wherein corrective measures include clearing data buffers.

19. The computer readable medium as in claim 10, wherein corrective measures include initiating re-authentication.

* * * * *